United States Patent
Sawada

(10) Patent No.: US 6,512,884 B1
(45) Date of Patent: Jan. 28, 2003

(54) METHOD AND APPARATUS FOR SYNCHRONIZED PLAY BACK OF AUDIO-VIDEO SIGNALS

(75) Inventor: Hideki Sawada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/417,658

(22) Filed: Oct. 14, 1999

(30) Foreign Application Priority Data

Oct. 15, 1998 (JP) .......................................... 10-294313

(51) Int. Cl.⁷ .............................................. H04N 5/928
(52) U.S. Cl. ......................... 386/96; 386/98; 348/423.1; 348/515; 375/240.26; 375/240.28
(58) Field of Search .............................. 386/46, 95, 96, 386/97, 98, 99, 111, 100, 104, 105, 119; 713/501, 500.1; 375/240.26, 240.28; 348/515, 423.1; H04N 5/928

(56) References Cited

U.S. PATENT DOCUMENTS

| | | | |
|---|---|---|---|
| 5,923,869 A | * 7/1999 | Kashiwagi et al. | ......... 713/501 |
| 6,078,725 A | * 6/2000 | Tanaka | ...................... 386/100 |
| 6,130,987 A | * 10/2000 | Tanaka | ........................ 386/96 |
| 6,151,441 A | * 11/2000 | Kawamura et al. | ........... 386/95 |
| 6,163,646 A | * 12/2000 | Tanaka et al. | ................. 386/96 |
| 6,163,647 A | * 12/2000 | Terashima et al. | ............ 386/96 |

FOREIGN PATENT DOCUMENTS

JP          10-136308          5/1998

* cited by examiner

Primary Examiner—Vincent Boccio
(74) Attorney, Agent, or Firm—Foley & Lardner

(57) ABSTRACT

A method and an apparatus for synchronized play back of audio-video signals, even when plural digitally compressed audio data are separated and played back, avoid time lag or lead of reference time after the audio data are changed over and can improve the performance of play back of audio data synchronizing with video data, is provided. An apparatus for synchronized play back of audio-video signals decodes and plays back and displays plural digitally compressed audio data and digitally compressed video data. When the audio data to be decoded are changed over, a reference time generator calculates reference time base on the amount of played back data of the changed over decoded audio data. With this reference time, a synchronizing controller controls a video decoder and makes the decoded video data and the changed over audio data synchronize and plays back and displays the audio data and the video data.

8 Claims, 9 Drawing Sheets

METHOD AND APPARATUS FOR SYNCHRONIZED PLAY BACK OF AUDIO-VIDEO SIGNALS

BACKGROUND OF THE INVENTION

The present invention relates to a method and an apparatus for synchronized play back of audio-video signals, which have a high performance when particularly plural digitally compressed audio data and digitally compressed video data are decoded and played back.

DESCRIPTION OF THE RELATED ART

Generally, an apparatus for synchronized play back of audio-video signals reads digitally compressed audio-video (AV) signals recorded in a recording medium. such as a CD-ROM or a hard disk (HD) and plays back on a CRT monitor and to a speaker by decompressing the signals.

However, at a conventional apparatus for synchronized play back of audio-video signals, the performance of a clock is not sufficient, consequently, there is a problem that sufficient resolution applying for synchronizing control can not be obtained. In order to solve this problem, Japanese Patent Application Laid-Open No. HEI 10-136308 discloses an apparatus for synchronized play back of audio-video signals.

In this application, reference time is obtained from the amount of data of played back audio data (for example, pulse code modulation (PCM) data), and video playing back is made to synchronize with this reference time (for example, by frame dropping of video data), and synchronized play back of audio-video signals is performed.

In this apparatus, as mentioned in this application, audio signals can be processed as the first priority, consequently the audio data do not become intermittent. Therefore, the play back without abnormal feeling can be performed, and when frame dropping is performed, the frame dropping is performed in the order of the frame whose priority is high, as a result, video signals can be smoothly played back.

However, at conventional apparatuses for synchronized play back of audio-video signals, a case that plural compressed audio data are multiplexed is not considered. For example, at the conventional technology of the mentioned above application, at the play back of the compressed AV data whose plural audio data are multiplexed, there is a case that audio data are changed over. In this case, when the compressed multiplexing AV data to be separated are merely changed over, generally, the AV separation from the compressed AV data is sequentially performed. However there is a problem that the compressed audio data applied the AV separation, which should be essentially played back at the same time at before and after the changing over, are overlapped, or the separated compressed audio data to be played back at designated time are lost.

FIGS. 1 and 2 are conceptual diagrams showing a series of compressed multiplexing AV data and a series of compressed audio data applied AV separation, at the conventional apparatus for synchronized play back of audio-video signals. Referring to FIGS. 1 and 2, the problem mentioned above is explained in detail. In FIGS. 1 and 2, in Audio $N_T$, N means the number of audio and $T$ means time.

For example, in FIG. 1, when the compressed multiplexing AV data are changed over from audio (0) to (1) at point A, at the separated compressed audio data, the audio data at time $(_0)$ and $(_1)$ are overlapped. In FIG. 2, when the compressed multiplexing AV data are changed over from audio (1) to (0) at point B, at the separated compressed audio data, the audio data at time $(_2)$ and $(_3)$ are lost.

As mentioned above, at the conventional apparatus in which reference time is obtained from the amount of cumulative data (for example, PCM data) outputted from the starting of play back, the reference time after the audio data are changed over has time lag or lead, and the synchronized play back after the audio data are changed over is not secured.

SUMMARY OF THE INVENTION

It is therefore an object of the present invention to provide a method and an apparatus for synchronized play back of audio-video signals in which time lag or lead of the reference time after the audio data are changed over can be avoided and the performance of the synchronized play back after the audio data are changed over can be increased, even in a case that plural digitally compressed audio data are separated and played back.

According to a first aspect of the present invention, for achieving the objects mentioned above, a method for synchronized play back of audio-video signals, which decodes and plays back plural digitally compressed audio data and digitally compressed video data, when said plural digitally compressed audio data are changed over and one of said plural digitally compressed audio data is selected and played back, provides the steps of obtaining reference time based on the amount of played back data of said changed over decoded audio data, and playing back said changed over decoded audio data synchronizing with video data decoded said digitally compressed video data, based on said reference time.

According to a second aspect of the present invention, in the first aspect, said reference time T based on the amount of played back data of said changed over decoded audio data is calculated by an equation, $T=T2+T1-T3$, using the following T1, T2 and T3, decoding start time T1 for said changed over audio data to be decoded, played back time T2 of decoded audio data calculated by the amount of the played back data of said changed over decoded audio data, and decoding start time T3 for said video data to be decoded.

According to a third aspect of the present invention, in the first aspect, when said changed over decoded audio data are played back synchronizing with said video data decoded digitally compressed video data, based on said reference time, the present invention further provides the step of comparing time that said reference time T is added to said decoding start time T3 for said video data to be decoded with decoding time of the oldest inputted frame to be decoded in frames of undecoded video data in said digitally compressed video data. When said added time is prior time to said decoding time of said oldest inputted frame to be decoded, by judging a preceding state whose preceding time is time from said added time to said decoding time of said oldest inputted frame, the present invention provides the step of weighting for decoding for said video data corresponding to said preceding time. And when said added time is posterior time to said decoding time of said oldest inputted frame to be decoded, by judging a delaying state whose delaying time is time from said decoding time of the oldest inputted frame to said added time, the present invention provides the step of frame dropping of number of frames corresponding to said delaying time for said video data.

According to a fourth aspect of the present invention, in the third aspect, said frame dropping of the number of frames corresponding to said delaying time for said video data makes frames to be dropped give the order of priority and performs the frame dropping from the frames having high priority.

According to a fifth aspect of the present invention, an apparatus for synchronized play back of audio-video signals provides an audio-video (AV) separating means, to which compressed multiplexing data of digitally compressed video data and plural digitally compressed audio data are inputted, and separates the inputted data into the digitally compressed video data and instructed audio data corresponding to an index (ID) instructed from an external input through an audio changing over means in said plural digitally compressed audio data, a video decoder, in which said digitally compressed video data separated at said AV separating means are decoded, and outputs the decoded video data, an audio decoder, in which said instructed audio data separated at said AV separating means are decoded, and outputs the decoded audio data, an audio play back controlling means in which playing back of said decoded audio data is controlled, an audio counter which calculates the amount of played back data of said decoded audio data played back at said audio play back controlling means, a clock generating means which calculates reference time based on said amount of played back data calculated at said audio counter, decoding start time of said video data at said video decoder, and decoding start time of said instructed audio data at said audio decoder, and a synchronizing controlling means which makes said decoded video data and said decoded audio data synchronize for playing back by controlling the operation of said video decoder based on said reference time.

According to a sixth aspect of the present invention, in the fifth aspect, at said clock generating means, reference time T based on the amount of played back data calculated at said audio counter, the decoding start time of said video data at said video decoder, and the decoding start time of said instructed audio data at said audio decoder is calculated by an equation, T=T2+T1−T3, using the following T1, T2 and T3, decoding start time T1 of said instructed audio data corresponding to said ID instructed by said external input, played back time T2 of decoded audio data calculated by the amount of the played back data of said instructed audio data corresponding to said ID instructed by said external input, and decoding start time T3 for said video data to be decoded.

According to a seventh aspect of the present invention, in the fifth aspect, when said decoded audio data of said instructed audio data are played back synchronizing with said video data of said decoded digitally compressed video data, said synchronizing controlling means compares the time that said reference time T is added to said decoding start time T3 of said video data to be decoded with the decoding time of the oldest inputted frame to be decoded in frames of undecoded video data, when said added time is prior time to said decoding time of said oldest inputted frame, by judging a preceding state whose preceding time is time from said added time to the decoding time of said oldest inputted frame, said synchronizing controlling means performs weighting for said video data corresponding to said preceding time, and when said added time is posterior time to said decoding time of said oldest inputted frame, by judging a delaying state whose delaying time is time from said decoding time of said oldest inputted frame to said added time, said synchronizing controlling means performs frame dropping for said video data corresponding to said delaying time.

According to a eighth aspect of the present invention, in the seventh aspect, at said synchronizing controlling means, said frame dropping of the number of frames corresponding to said delaying time for said video data makes frames to be dropped give the order of priority and performs the frame dropping from the frames having high priority.

According to a ninth aspect of the present invention, in the fifth aspect, said audio changing over means inputs said ID to said AV separating means in order to instruct said audio data, and said audio counter, based on a signal outputted from said audio changing over means, makes the calculated result of the amount of played back audio data of said decoded audio data played back at said audio, play back controlling means reset.

According to the present invention, an apparatus for synchronized play back of audio-video signals of the present invention decodes digitally compressed audio data and digitally compressed video data and plays back the decoded audio data synchronized with decoded video data. And the apparatus of the present invention controls the synchronization based on reference time obtained from the amount of played back audio data of decoded audio data. When compressed AV data with plural compressed multiplexing audio data are played back and the plural compressed audio data are changed over, and even at the case that discontinuity occurs on the time base of the compressed audio data to be separated, corresponding to the reference time obtained from the amount of played back data of the decoded audio data, the audio data can be played back synchronizing with the video data by the same synchronizing control method before the audio data are changed over.

An operation of an apparatus for synchronized play back of audio-video signals of the present invention is explained. Pulse code modulation (PCM) data stored in a PCM buffer memory are played back at an audio play back controller and outputted to a speaker. The amount of PCM data (decoded audio data) played back at the audio play back controller is counted at an audio counter and reference time is calculated from this cumulative amount of played back data at a clock generator. Based on this reference time, a synchronizing controller judges whether a delaying state or a preceding state at a video decoder and controls the synchronizing operation.

At the case that the compressed audio data recorded in a data recording equipment are plural multiplexing data, when the changing over of audio data is instructed from an external input, an audio changing over controller makes the audio counter reset the amount of played back audio data before the audio data are changed over. And the clock generator corrects the calculating reference time.

By this correction of the reference time, even after the audio data are changed over, the clock generator can calculate the reference time continuing to before the audio data are changed over with the amount of the played back audio data. And the synchronizing controller can make the video decoder perform the same synchronizing play back before the audio data are changed over.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
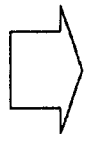
FIG. 1 is a conceptual diagram showing a series of compressed multiplexing AV data and a series of compressed audio data applied AV separation, at a conventional apparatus for synchronized play back of audio-video signals.
Figure 2:
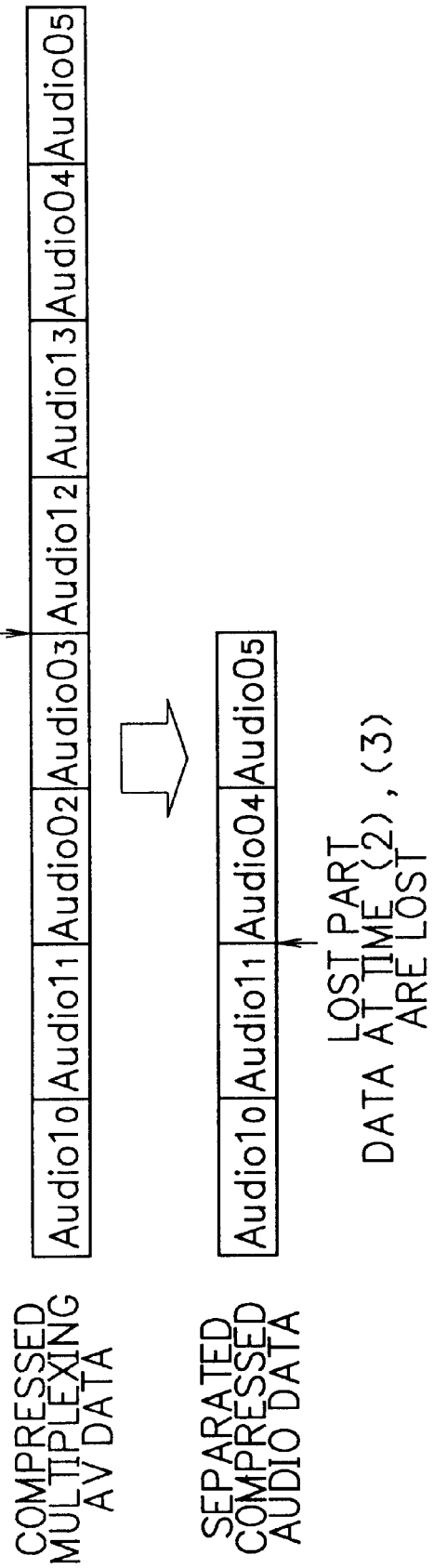
FIG. 2 is a conceptual diagram showing a series of compressed multiplexing AV data and a series of compressed audio data applied AV separation, at a conventional apparatus for synchronized play back of audio-video signals.
Figure 3:
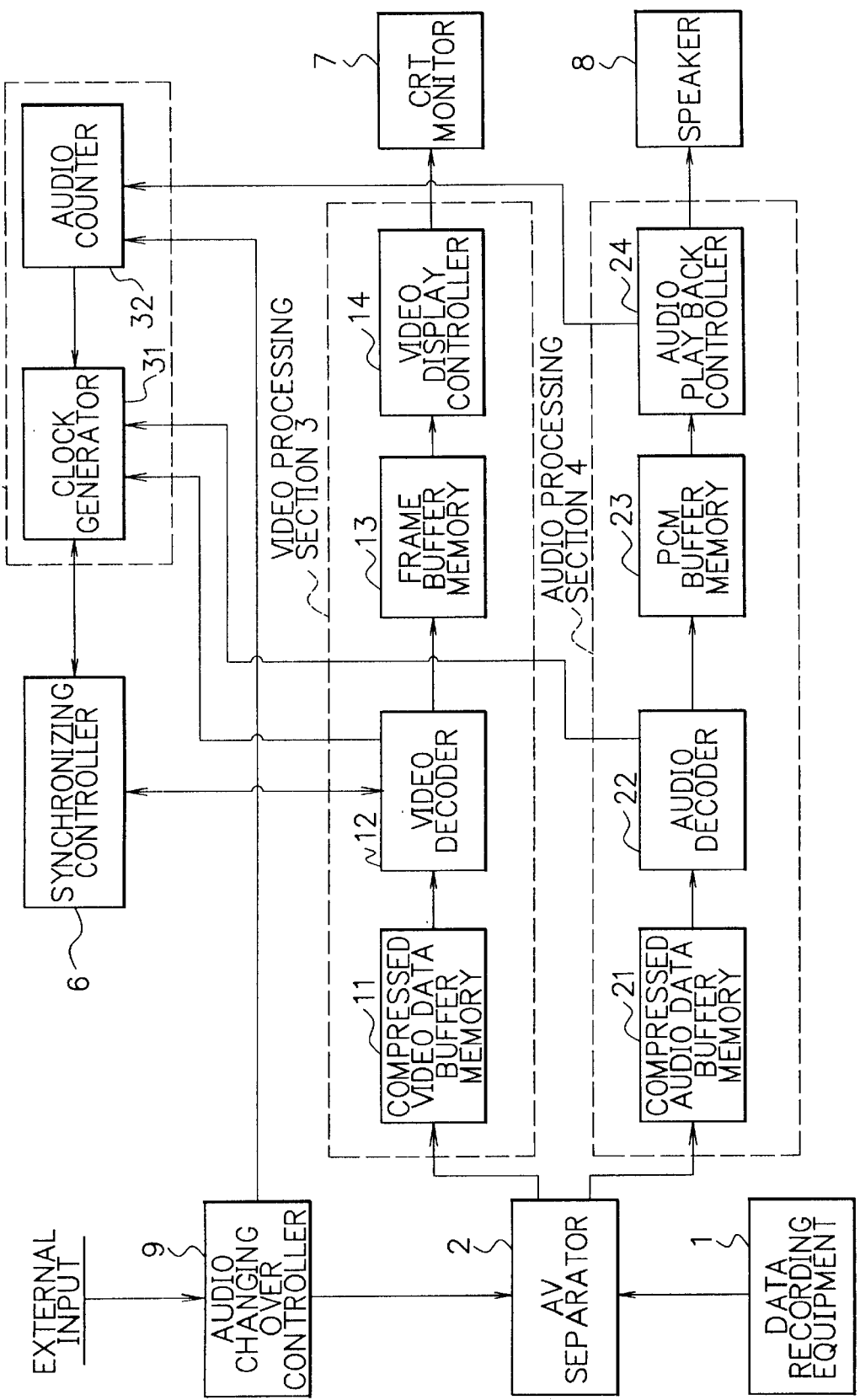
FIG. 3 is a block diagram showing an embodiment of an apparatus for synchronized play back of audio-video signals of the present invention.

Referring now to the drawings, an embodiment of the present invention is explained in detail. FIG. 3 is a block diagram showing an embodiment of an apparatus for synchronized play back of audio-video signals of the present invention.

As shown in FIG. 3, the embodiment of the apparatus for synchronized play back of audio-video signals of the present invention consists of a data recording equipment 1, an audio-video (AV) separator 2, a video processing section 3, an audio processing section 4, a reference time generating section 5, a synchronizing controller 6, a CRT monitor 7, a speaker 8 and an audio changing over controller 9.

The data recording equipment 1 records at least one or more digitally compressed audio data and digitally compressed video data. The AV separator 2 separates compressed multiplexing AV data recorded in the data recording equipment 1 into compressed video data and compressed audio data. The AV separator 2 can separate and output only audio data instructed by the audio changing over controller 9 from the plural compressed audio data.

Decoding processing is applied for the compressed video data outputted from the AV separator 2 at the video processing section 3 and the video data are displayed on the CRT monitor 7. And decoding processing is also applied for the compressed audio data outputted from the AV separator 2 at the audio processing section 4 and the audio data are outputted to the speaker 8.

As shown in FIG. 3, the video processing section 3 consists of a compressed video data buffer memory 11 in which the compressed video data are temporarily stored, a video decoder 12 in which the compressed video data are decoded, a frame buffer memory 13 in which the decoded video data are temporarily stored and a video display controller 14 which controls displaying the video data on the CRT monitor 7.

As the same as the video processing section 3, the audio processing section 4 consists of a compressed audio data buffer memory 21 in which the compressed audio data are temporarily stored, an audio decoder 22 in which the compressed audio data are decoded, a PCM buffer memory 23 in which the decoded audio data (hereinafter referred to as PCM data) are temporarily stored and an audio play back controller 24 which controls playing back the PCM data.

And the reference time generating section 5 generates reference time based on the amount of the played back data of the PCM data played back at the audio play back controller 24.

As shown in FIG. 3, the reference time generating section 5 consists of an audio counter 32 which counts the amount of played back PCM data and a clock generator 31 in which the reference time is calculated based on the amount of cumulative data counted at the audio counter 32.

The synchronizing controller 6 distinguishes whether the state of the video decoder 12 is delaying or preceding based on the reference time generated at the reference time generating section 5. And the synchronizing controller 6 controls frame drop processing or weighting processing at the video decoder 12 and performs the synchronized play back controlling of the audio and video data.

When the audio changing over controller 9 receives an instruction making audio change over from an external input, the audio changing over controller 9 instructs the AV separator 2 to change over the compressed audio data to be separated. And further the audio changing over controller 9 makes the audio counter 32 reset the amount of the played back PCM data before the audio data are changed over, counted at the audio counter 32.

Next, referring to FIGS. 3 to 9, an operation of the embodiment of the apparatus for synchronized play back of audio-video signals of the present invention shown in FIG. 3 is explained in detail.

Figure 4:
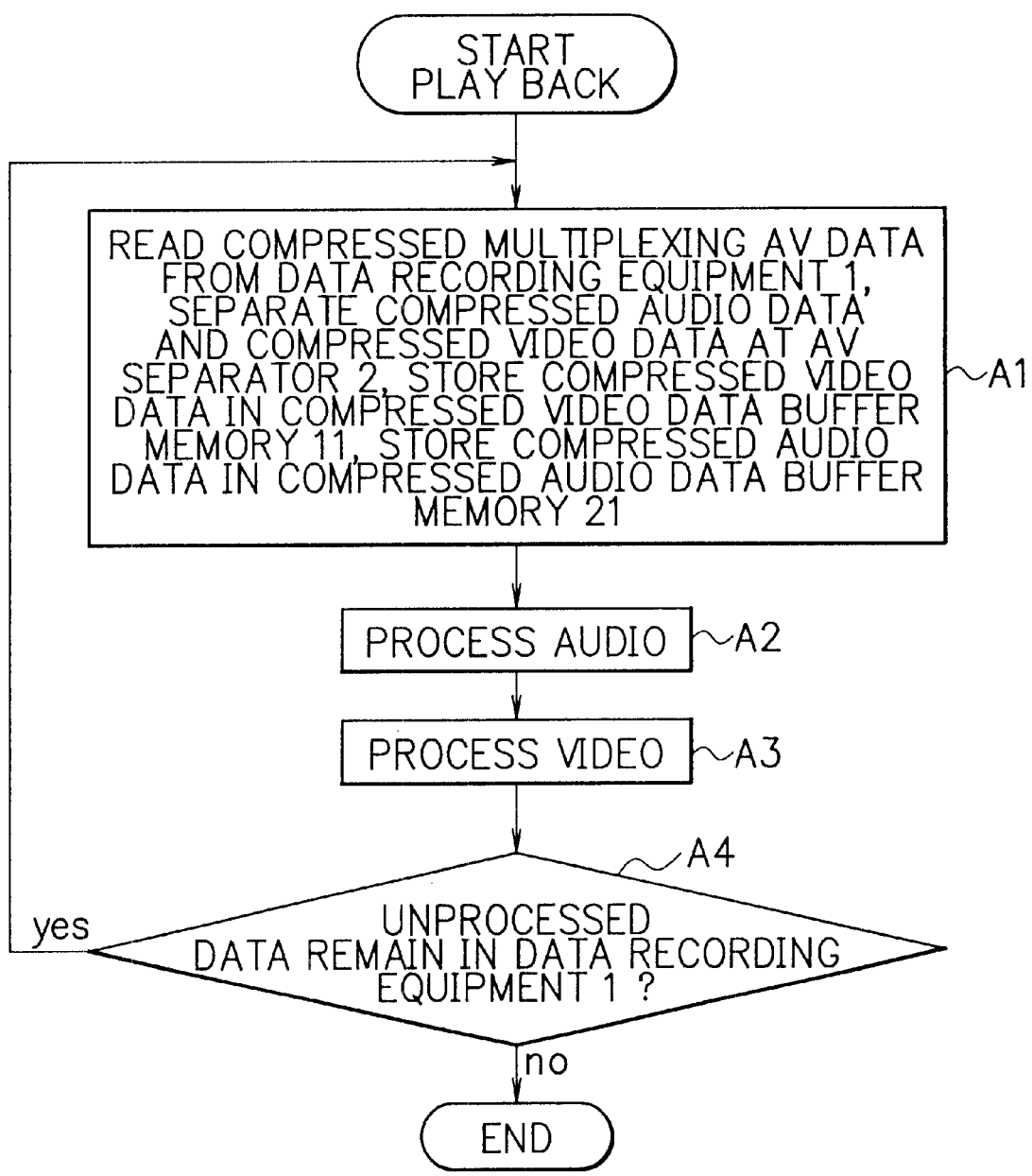
FIG. 4 is a flowchart showing a play back process of the embodiment of the apparatus for synchronized play back of audio-video signals of the present invention shown in FIG. 3.

FIG. 4 is a flowchart showing a play back process of the embodiment of the apparatus for synchronized play back of audio-video signals of the present invention shown in FIG. 3.

First, referring to FIG. 4, the operation is explained. At step A1, the compressed multiplexing AV data are read from the data recording equipment 1 and the read data are separated into the compressed video data and the compressed audio data at the AV separator 2. The compressed video data are stored in the compressed video data buffer memory 11 and the compressed audio data are stored in the compressed audio data buffer memory 21.

In this, at the case that plural compressed multiplexing audio data exist in the compressed AV data recorded in the data recording equipment 1, the AV separator 2 separates only the compressed audio data having an index (ID) that an external input instructs. The apparatus for synchronized play back of audio-video signals of the present invention is not limited to apply only for the case that the plural compressed audio data are multiplexed in the compressed AV data. However, the effect of the present invention becomes clear by applying for the case that the plural compressed audio data are multiplexed. This effect is mentioned later in detail.

Next, at step A2, the decoding process and the play back process are applied for the compressed audio data at the audio processing section 4. And at step A3, the decoding process and the displaying process are applied for the compressed video data at the video processing section 3.

And at step A4, whether the unprocessed data remain or not in the data recording equipment 1 is judged, and at the case that the unprocessed data remain (yes at step A4), the operation returns to step A1 and the same processes are repeated. At the case that the unprocessed data do not remain (no at step A4), the decoding, play back and displaying processes are stopped.

In this, at the embodiment of the apparatus for synchronized play back of audio-video signals of the present invention shown in FIG. 3, the audio play back is continuously performed. Therefore, even while steps A1, A3 and A4 are processed, when an interruption of the decoding process for the compressed audio data occurs, the processes of the steps A1, A3 and A4 are suspended and the process at the step A2 is performed.

At the step A2, the PCM data decoded at the audio decoder 22 and temporarily stored in the PCM buffer memory 23 are outputted to the speaker 8 through the audio play back controller 24. Furthermore, the amount of played back PCM data outputted from the audio play back controller 24 are counted up one by one at the audio counter 32.

In the audio counter 32, the cumulative amount of the PCM data outputted from the start of the play back is counted. In this embodiment shown in FIG. 3, the amount of data is counted in byte unit.

Figure 5:
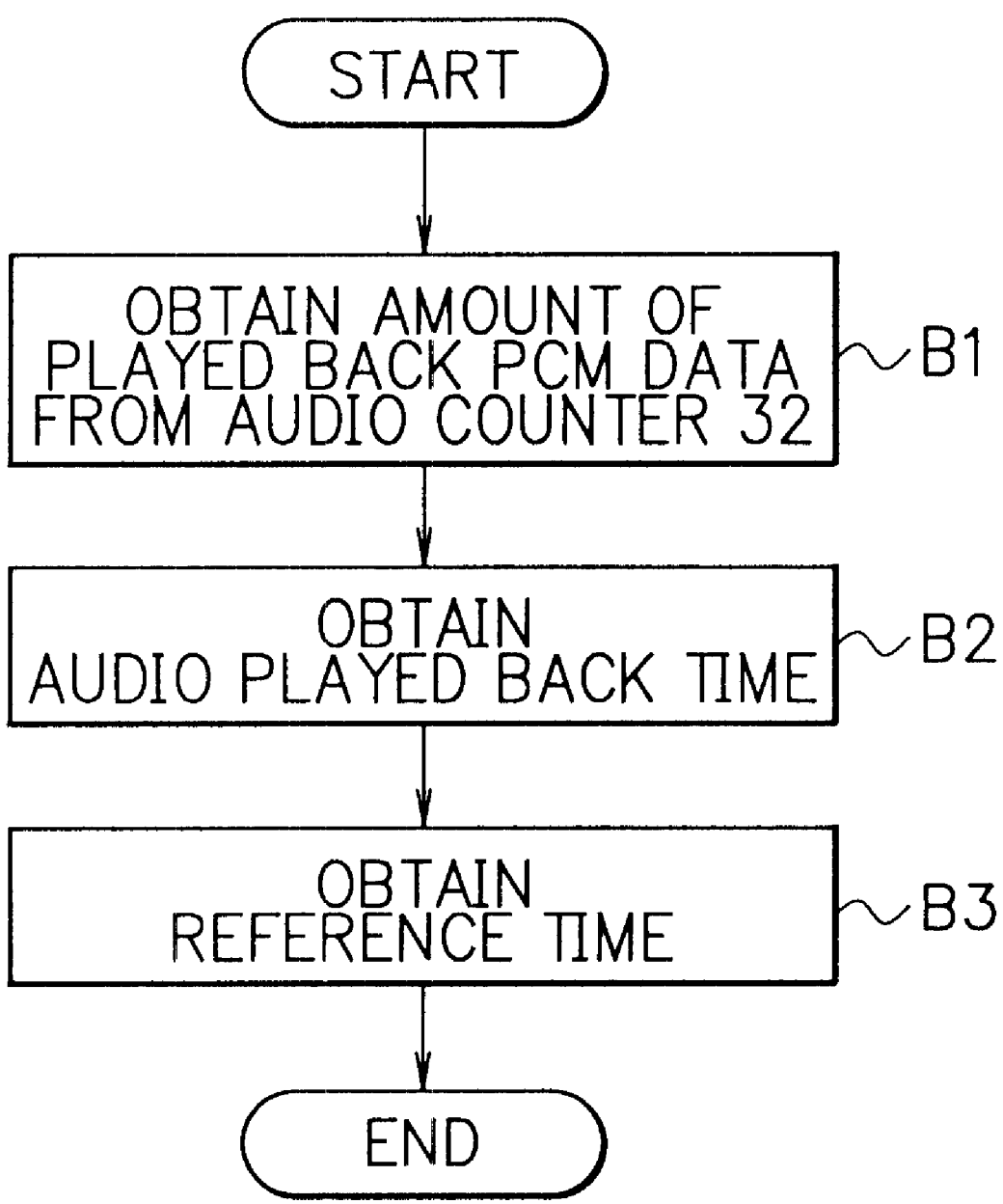
FIG. 5 is a flowchart showing the reference time generating process at the embodiment of the apparatus for synchronized play back of audio-video signals of the present invention shown in FIG. 3.
Figure 6:
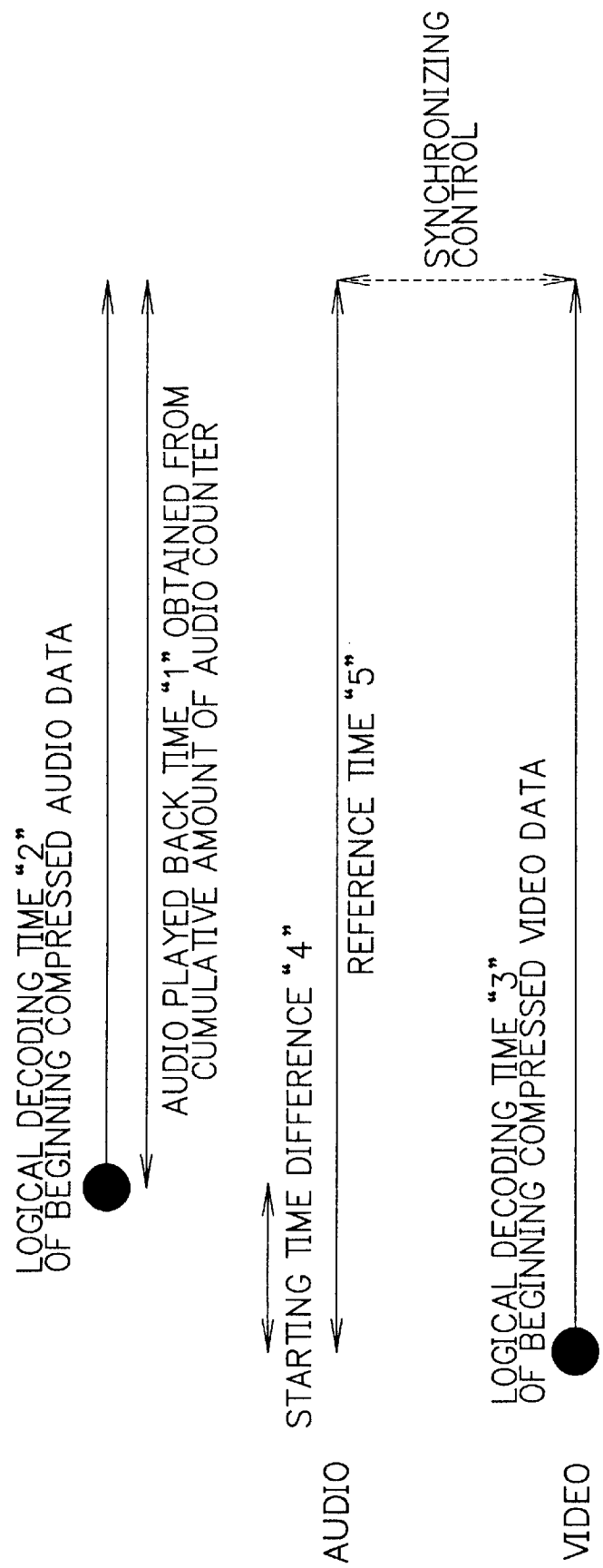
FIG. 6 is a conceptual diagram showing the reference time generating concept at the embodiment of the apparatus for synchronized play back of audio-video signals of the present invention shown in FIG. 3.

Next, referring to FIGS. 5 and 6, the reference time generating process and concept at the embodiment of the apparatus for synchronized play back of audio-video signals of the present invention shown in FIG. 3 are explained. FIG. 5 is a flowchart showing the reference time generating process at the embodiment of the apparatus for synchronized play back of audio-video signals of the present invention shown in FIG. 3. And FIG. 6 is a conceptual diagram showing the reference time generating concept at the embodiment of the apparatus for synchronized play back of audio-video signals of the present invention shown in FIG. 3.

As shown in FIG. 5, when the reference time generating section receives a request of the reference time from the synchronizing controller 6, first, at step B1, the clock generator 31 obtains the cumulative amount of the played back PCM data from the audio counter 32.

Next, at step B2 in FIG. 5, the clock generator 31 calculates the audio played back time "1" from the obtained cumulative amount of the played back PCM data (FIG. 6). For example, at the case of the data format of the PCM data, whose sampling frequency is 44.1 KHz, the number of stereo channels is 2 and one sample is 16 bits, the audio played back time "1" is calculated in the following equation.

"1"=the cumulative amount of data (bytes)/(44100×16/8 (bits)×2).

At step B3 in FIG. 5, the reference time "5" that is used for synchronizing control with the video data at the synchronizing controller 6 is obtained from the clock generator 31. At this time, the clock generator 31 obtains beforehand the logical decoding time "2" of the beginning compressed audio data right after starting the play back from the audio decoder 22. And the clock generator 31 obtains beforehand the logical decoding time "3" of the beginning compressed video data right after starting the play back from the video decoder 12.

And the clock generator 31 calculates the starting time difference "4" between the logical decoding time of audio and video by an equation, "4"="2"−"3". With these processes mentioned above, the clock generator 31 calculates the reference time "5" by adding the audio played back time "1" and the starting time difference "4" between the logical decoding time of audio and video data, that is, by an equation, "5"="1"+"4". The synchronizing controller 6 controls the decoding timing of the video decoder 12 based on the reference time "5" obtained from the clock generator 31.

In this, as the logical decoding time "2" of the beginning compressed audio data and the logical decoding time "3" of the beginning compressed video data used in the explanation mentioned above, for example, the time information used in a moving picture experts group (MPEG) can be applied. The MPEG is a known standard using for digital compression of data. In the MPEG, the play back is performed by synchronizing the multiplexed and compressed AV signal data, therefore the time information performs the play back and the display attached respectively to the audio data signals and video data signals in the AV signals at the compression.

Figure 7:
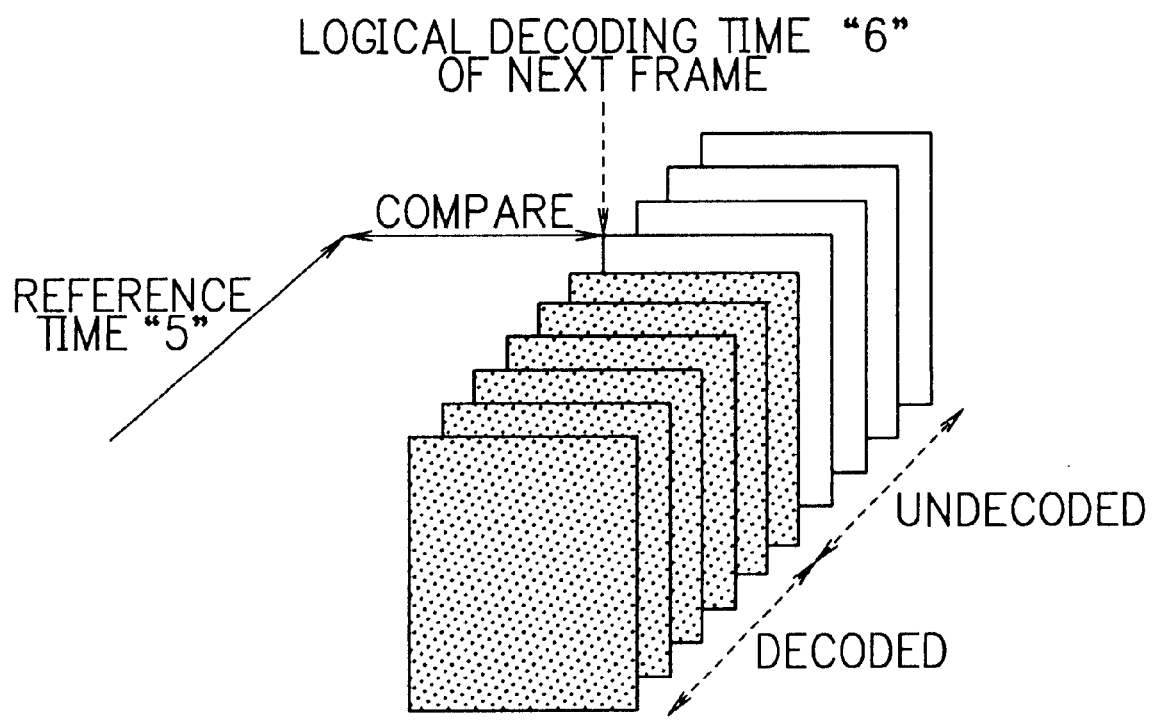
FIG. 7 is an operational conceptual diagram showing a synchronizing control method of the embodiment of the apparatus for synchronized play back of audio-video signals of the present invention in FIG. 3.

FIG. 7 is an operational conceptual diagram showing a synchronizing control method of the embodiment of the apparatus for synchronized play back of audio-video signals of the present invention in FIG. 3. Referring to FIG. 7, the synchronizing control method of the embodiment of the present invention is explained.

As shown in FIG. 7, the synchronizing controller 6 compares the reference time "5" obtained from the clock generator 31 with logical decoding time "6" of the undecoded next frame at the video decoder 12, and judges the delay or precedence of the decoding time. That is, at the case that the time added the logical decoding time "3" of the beginning compressed video data and the reference time "5" is prior time to the logical decoding time "6" of the undecoded next frame at the video decoder 12, the time from this added time to the logical decoding time "6" is preceding time and judged as a preceding state. And at the case that the time added the logical decoding time "3" of the beginning compressed video data and the reference time "5" is posterior time to the logical decoding time "6" of the undecoded next frame at the video decoder 12, the time from the logical decoding time "6" to this added time is delaying time and judged as a delaying state.

In this, the logical decoding time "6" of the undecoded next frame at the video decoder 12, as mentioned above, for example, the time information used in the MPEG can be applied. The MPEG is a known standard using for digital compression of data. In the MPEG, the play back is performed by synchronizing the multiplexed and compressed AV signal data, therefore the time information performs the play back and the display attached respectively to the audio data signals and video data signals in the AV signals at the compression.

And the synchronizing controller 6 instructs the video decoder 12 to process the frame drop of the number of frames corresponding to the delaying time in case of the delaying state, and to process weighting corresponding to the preceding time in case of the preceding state.

In this, at the case that the frame drop process is performed at the video decoder 12, for example, the order of priority is given depending on the types of compression of the compressed video data. And the frame drop is applied from the frame not using as a reference frame at decoding after this frame, with having priority.

The frame drop mentioned above is explained in more detail. In this, for example as an encoding system, the MPEG, which is an encoding system by referring existing interframes, is applied for the frames to be performed the frame drop.

In this case, the video signal data consist of a unit of a group of picture (GOP) gathered frames. The GOP is composed of a combination of an intra (I) picture, a predictive (P) picture and a bidirectional (B) picture. This composition is generally named as a frame structure.

The I picture is possible to decompress by itself without having a reference picture and a key frame referred at when frames after this are decompressed. The P picture uses a key frame decompressed right before as a reference frame at decompressing and is a key frame to be referred at when frames after this are decompressed. The B picture uses a key frame decompressed right before as a reference frame at decompressing and is a frame not to be referred at when frames after this are decompressed.

As mentioned above, the key frame is a frame that is referred by other pictures. Therefore, when the frame drop of the key frame is performed, the decompression of P and B pictures after this can not be performed and the frame drops until right before the next I picture appears are performed.

Accordingly, at the case that the MPEG, which is the encoding system by referring existing interframes, is applied, at the frame drop in the synchronizing controller 6, the order of the B picture, P picture and I picture is preferable as the order of priority of the frame drop.

Figure 8:
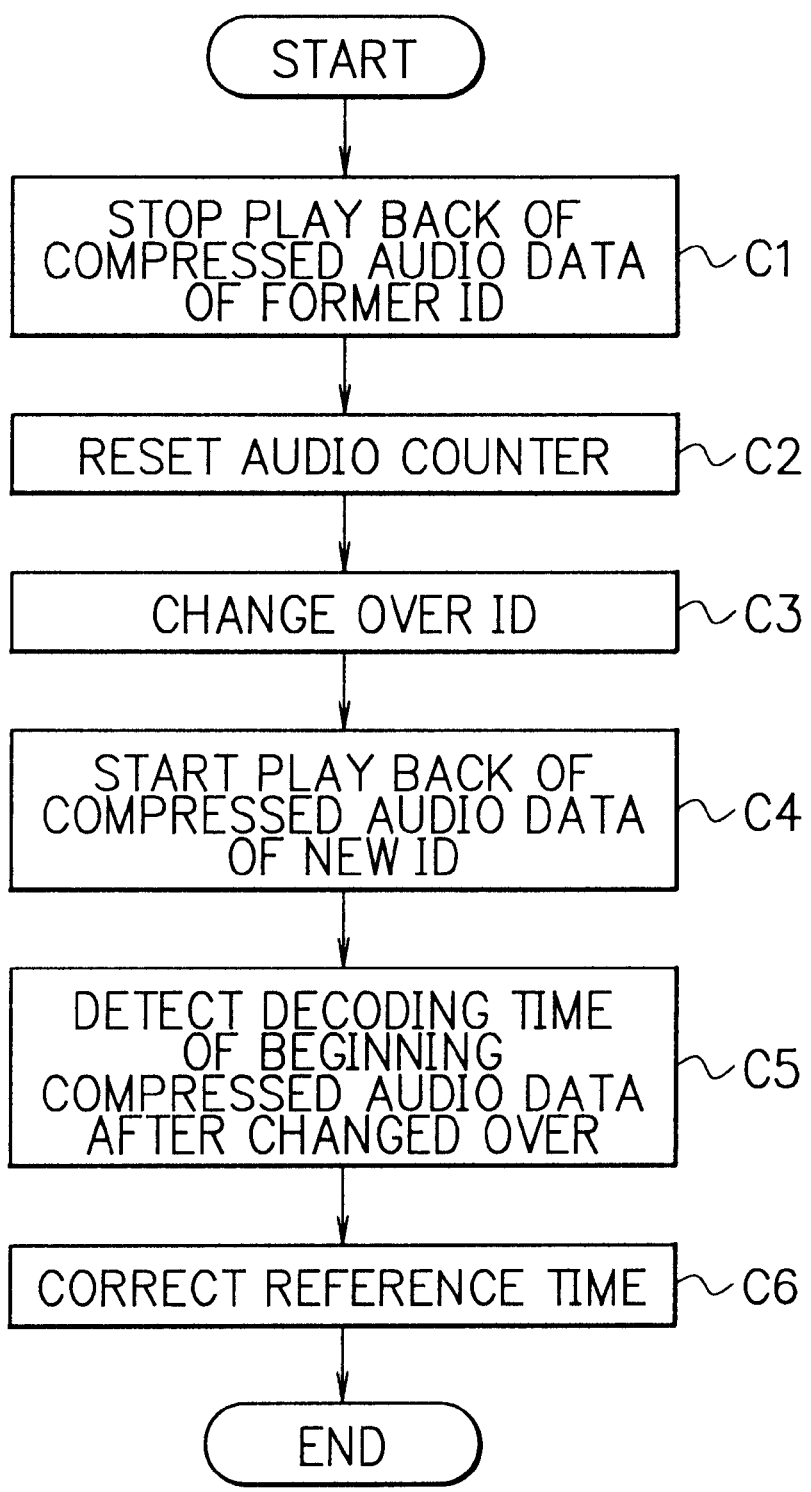
FIG. 8 is a flowchart showing an audio changing over control process when the audio changing over is instructed by an external input at the embodiment of the present invention shown in FIG. 3.
Figure 9:
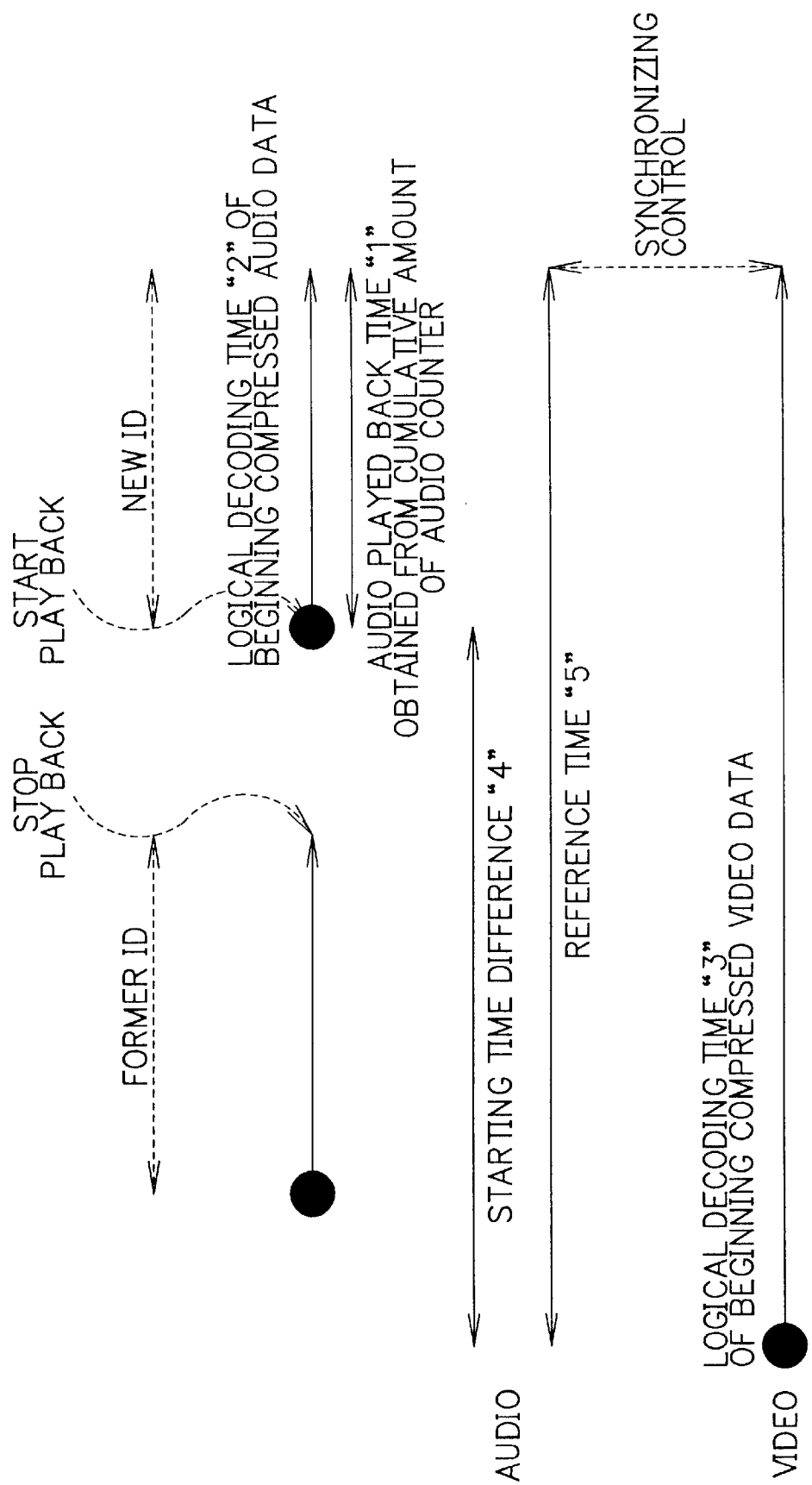
FIG. 9 is a conceptual diagram showing the generation of the reference time after the audio data are changed over at the embodiment of the present invention shown in FIG. 3.

Next, referring to FIGS. 8 and 9, an operation at the case that the audio data to be played back are changed over in the plural digitally compressed audio data by an external input is explained, at the embodiment of the present invention shown in FIG. 3.

FIG. 8 is a flowchart showing an audio changing over control process when the audio changing over is instructed by an external input at the embodiment of the present invention shown in FIG. 3. FIG. 9 is a conceptual diagram showing the generation of the reference time after the audio data are changed over at the embodiment of the present invention shown in FIG. 3.

As shown in FIG. 8, first, when the audio changing over controller 9 receives the instruction of audio changing over from the external input, at step C1, the separation of the compressed audio data that is performing at the AV separator 2 based on the former ID is stopped and the decoding and playing back processes at the audio processing section 4 are also stopped.

Next, at step C2, the cumulative amount of the PCM data counted in the audio counter 32 is reset to zero (0).

At step C3, the audio changing over controller 9 instructs a new ID after the audio data are changed over to the AV separator 2 and makes the AV separator 2 restart the separation of the compressed audio data using the new ID.

At step C4, the audio processing section 4 restarts the decoding and playing back processes of the compressed audio data based on the new ID.

At step C5, the audio decoder 22 detects the logical decoding time of the beginning compressed audio data right after the starting of play back after the ID is changed over and informs the detected time to the clock generator 31.

In this, as the logical decoding time of the beginning compressed audio data right after the starting of play back after the ID is changed over, as mentioned above, for example, the time by the time information used in the MPEG can be applied. The MPEG is the known standard using for digital compression of data. In the MPEG, the play back is performed by synchronizing the multiplexed and compressed AV signal data, therefore the time information performs the play back and display attached respectively to the audio data signals and video data signals in the AV signals at the compression.

At step C6, the clock generator 31 corrects the reference time. The correcting process of the reference time at the step C6 is performed at an operation shown in FIG. 9. As shown in FIG. 9, the correcting process is performed by that the former logical decoding time "2" of the beginning compressed audio data is replaced by the logical decoding time of the beginning compressed audio data right after the starting of play back after the ID is changed over, detected at the step C5. Based on this replaced logical decoding time "2", the starting time difference "4" between audio and video data is calculated by an equation, "4"="2"–"3".

And the clock generator 31 calculates the reference time "5" after the audio data are changed over by adding the played back time of audio "1" after the audio data are changed over and the starting time difference "4" between the logical decoding time of audio and video data, that is, by an equation "5"="1"+"4", as the same as before the audio data are changed over.

As mentioned above, from the clock generator 31, even after the audio data are changed over, the reference time continuing to before the audio data are changed over can be obtained. Consequently, the synchronizing controller 6 continuously performs the synchronizing control based on the reference time calculated at the clock generator 31, by the same way after and before the audio data are changed over. Therefore, even at the case that plural digitally compressed audio data are separated and played back, the time lag or lead of the reference time after the audio data are changed over is avoided, and the performance of the synchronized play back after the audio data are changed over can be improved.

As it is clear from the explanation mentioned above, according to the present invention, at the case that the audio data are changed over when the compressed AV data in which plural compressed audio data are multiplexed are played back, not only the compressed audio data to be separated from the compressed AV data are changed over but also the reference time obtained based on the amount of the played back data of the decoded audio data is corrected. Therefore, even at the case that the time base of the compressed audio data to be separated from the compressed AV data has some discontinuity, from the amount of the played back data of the decoded audio data after the audio data are changed over, the reference time continuing to before the audio data changed over can be obtained. Accordingly, even after the audio data are changed over, by the same synchronizing control method as before the audio data are changed over, the synchronized play back of audio-video signals can be performed. Even at the case that plural digitally compressed audio data are separated and played back, the time lag or lead of the reference time after the audio data are changed over is avoided, and the performance of the synchronized play back after the audio data are changed over can be improved.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A method for synchronized play back of audio-video signals, which decodes and plays back a plurality of digitally compressed audio data and digitally compressed video data, when said plurality of digitally compressed audio data are changed over and one of said plurality of digitally compressed audio data is selected and played back, comprising the steps of:

obtaining reference time based on the amount of played back data of said changed over decoded audio data; and playing back said changed over decoded audio data synchronized with video data decoded from said digitally compressed video data, based on said reference time, wherein said reference time T based on the amount of played back data of said changed over decoded audio data is calculated by an equation:

$T=T2+T1-T3$, using the following $T1$, $T2$ and $T3$:

decoding start time $T1$ for said changed over audio data to be decoded, played back time $T2$ of decoded audio data calculated by the amount of the played back data of said changed over decoded audio data, and decoding start time $T3$ for said video data to be decoded.

2. A method for synchronized play back of audio-video signals in accordance with claim 1, when said changed over decoded audio data are played back synchronized with said video data decoded digitally from compressed video data, based on said reference time, further comprising the steps of;

comparing time that said reference time T is added to said decoding start time T3 for said video data to be decoded with a decoding time of the oldest inputted frame to be decoded in frames of undecoded video data in said digitally compressed video data;

when said added time is prior time to said decoding time of said oldest inputted frame to be decoded, by judging a preceding state whose preceding time is time from said added time to said decoding time of said oldest inputted frame, weighting for decoding for said video data corresponding to said preceding time; and when said added time is posterior time to said decoding time of said oldest inputted frame to be decoded, by judging a delaying state whose delaying time is time from said decoding time of the oldest inputted frame to said added time, frame dropping of a number of frames corresponding to said delaying time for said video data.

3. A method for synchronized play back of audio-video signals in accordance with claim 2, wherein:

said frame dropping of the number of frames corresponding to said delaying time for said video data prioritizes frames to be dropped and performs the frame dropping from the frames having high priority.

4. An apparatus for synchronized play back of audio-video signals, comprising:

an audio-video (AV) separating means, to which compressed multiplexed data of digitally compressed video data and a plurality of digitally compressed audio data are inputted, for separating the inputted data into the digitally compressed video data and indexed audio data corresponding to an index (ID) given from an external input through an audio changing over means in said plurality of digitally compressed audio data;

a video decoder, in which said digitally compressed video data separated at said AV separating means are decoded, for outputting decoded video data;

an audio decoder, in which said indexed audio data separated at said AV separating means are decoded, for outputting decoded audio data;

an audio play back controlling means in which playing back of said decoded audio data is controlled;

an audio counter which calculates the amount of played back data of said decoded audio data played back at said audio play back controlling means;

a clock generating means which calculates reference time based on said amount of played back data calculated at said audio counter, decoding start time of said video data at said video decoder, and decoding start time of said instructed audio data at said audio decoder; and a synchronizing controlling means which makes said decoded video data and said decoded audio data synchronize for playing back by controlling the operation of said video decoder based on said reference time.

5. An apparatus for synchronized play back of audio-video signals in accordance with claim 4, wherein:

at said clock generating means, reference time T based on the amount of played back data calculated at said audio counter, the decoding start time of said video data at said video decoder, and the decoding start time of said instructed audio data at said audio decoder is calculated by an equation:

$T=T2+T1-T3$, using the following $T1$, $T2$ and $T3$, decoding start time $T1$ of said instructed audio data corresponding to said ID instructed by said external input, played back time $T2$ of decoded audio data calculated by the amount of the played back data of said instructed audio data corresponding to said ID instructed by said external input, and decoding start time $T3$ for said video data to be decoded.

6. An apparatus for synchronized play back of audio-video signals in accordance with claim 4, wherein:

when said decoded audio data of said instructed audio data are played back synchronously with said video data of said decoded digitally compressed video data, said synchronizing controlling means compares the time that said reference time T is added to said decoding start time T3 of said video data to be decoded with the decoding time of the oldest inputted frame to be decoded in frames of undecoded video data;

when said added time is prior time to said decoding time of said oldest inputted frame, by judging a preceding state whose preceding time is time from said added time to the decoding time of said oldest inputted frame, said synchronizing controlling means performs weighting for said video data corresponding to said preceding time; and when said added time is posterior time to said decoding time of said oldest inputted frame, by judging a delaying state whose delaying time is time from said decoding time of said oldest inputted frame to said added time, said synchronizing controlling means performs frame dropping for said video data corresponding to said delaying time.

7. An apparatus for synchronized play back of audio-video signals in accordance with claim 6, wherein:

at said synchronizing controlling means, said frame dropping of the number of frames corresponding to said delaying time for said video data prioritizes frames to be dropped and performs the frame dropping from the frames having high priority.

8. An apparatus for synchronized play back of audio-video signals in accordance with claim 4, wherein:

said audio changing over means inputs said ID to said AV separating means in order to instruct said audio data, and said audio counter, based on a signal outputted from said audio changing over means, makes the calculated result of the amount of played back audio data of said decoded audio data played back at said audio play back controlling means reset.

\* \* \* \* \*